(12) United States Patent
Chen et al.

(10) Patent No.: US 11,300,403 B2
(45) Date of Patent: Apr. 12, 2022

(54) OPTICAL ENCODER AND METHOD OF OPERATING THE SAME

(71) Applicant: AEOLUS ROBOTICS CORPORATION LIMITED, Hong Kong (HK)

(72) Inventors: Sheng-Chia Chen, Taipei (TW); Sheng-Chun Juan, Taipei (TW); Hong Bin Koh, Taipei (TW)

(73) Assignee: AEOLUS ROBOTICS CORPORATION LIMITED, Wanchai (HK)

( * ) Notice: Subject to any disclaimer, the term of this patent is extended or adjusted under 35 U.S.C. 154(b) by 466 days.

(21) Appl. No.: 15/857,457

(22) Filed: Dec. 28, 2017

(65) Prior Publication Data

US 2019/0204075 A1  Jul. 4, 2019

(51) Int. Cl.
*G01B 11/26* (2006.01)
*G01B 11/02* (2006.01)
*G01D 5/347* (2006.01)

(52) U.S. Cl.
CPC ............ *G01B 11/26* (2013.01); *G01B 11/026* (2013.01); *G01D 5/3473* (2013.01)

(58) Field of Classification Search
CPC ..... G01B 11/026; G01B 11/26; G01D 5/3473

USPC .................................................... 356/139.06
See application file for complete search history.

(56) References Cited

U.S. PATENT DOCUMENTS

| 4,736,187 | A | 4/1988 | Kibrick et al. |
| 6,330,522 | B1 | 12/2001 | Takeuchi |
| 6,393,217 | B1* | 5/2002 | Takanashi ................ G03B 5/00 396/349 |
| 2011/0210238 | A1 | 9/2011 | An et al. |

OTHER PUBLICATIONS

European Patent Office, European Search Report, European Patent Application No. 18213710.9, dated May 29, 2019, 7 pages.

\* cited by examiner

*Primary Examiner* — Daniel L Murphy
(74) *Attorney, Agent, or Firm* — Fenwick & West LLP

(57) ABSTRACT

A coding disc having a first surface and a second surface opposite to the first surface is provided. The coding disc includes a first aperture and a second aperture. The first aperture penetrates the coding disc from the first surface of the coding disc to the second surface of the coding disc. The first aperture has a first width. The second aperture penetrates the coding disc from the first surface of the coding disc to the second surface of the coding disc. The second aperture has a second width. The second width of the second aperture is different from the first width of the first aperture.

14 Claims, 7 Drawing Sheets

OPTICAL ENCODER AND METHOD OF OPERATING THE SAME

BACKGROUND

1. Technical Field

The present disclosure relates generally to an apparatus and a method for detecting a position and a motion thereof using sensor devices, and more specifically to an apparatus and a method for detecting a position and a motion thereof using optical encoder sensors.

2. Description of the Related Art

Optical encoders are useful in many applications. For example, optical encoders can be used to determine a position, a motion or an angle of an object by transforming a physical position into an electrical signal corresponding to such position. In a comparative rotation mechanism (e.g., robotic arm), two optical encoders are required at the joint part of the rotation mechanism to detect or measure the position or the rotating angle of the rotation mechanism and to determine whether the position or the rotation angle of the rotation mechanism has reached a limited portion or angle. However, the use of more optical encoders would increase the cost, which would in turn reduce competitiveness in the market.

SUMMARY

In one or more embodiments, a coding disc having a first surface and a second surface opposite to the first surface is provided. The coding disc includes a first aperture and a second aperture. The first aperture penetrates the coding disc from the first surface of the coding disc to the second surface of the coding disc. The first aperture has a first width. The second aperture penetrates the coding disc from the first surface of the coding disc to the second surface of the coding disc. The second aperture has a second width. The second width of the second aperture is different from the first width of the first aperture.

In one or more embodiments, an encoder includes a light emitter, an optical sensor and an opaque plate. The light emitter has a light emitting region. The optical sensor has an optical sensing region facing the light emitting region. The opaque plate is disposed between the light emitting region and the optical sensing region. The opaque plate includes a first aperture and a second aperture. The first aperture penetrates the opaque plate. The first aperture/slot has a first width. The second aperture penetrates the opaque plate. The second aperture has a second width. The second width of the second aperture is different from the first width of the first aperture.

In one or more embodiments, a method of determining a position of an object includes determining a reference time period; comparing a first time period of a first signal with the reference time period; and determining the position of the object depending on the comparison between the first time period and the reference time period.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
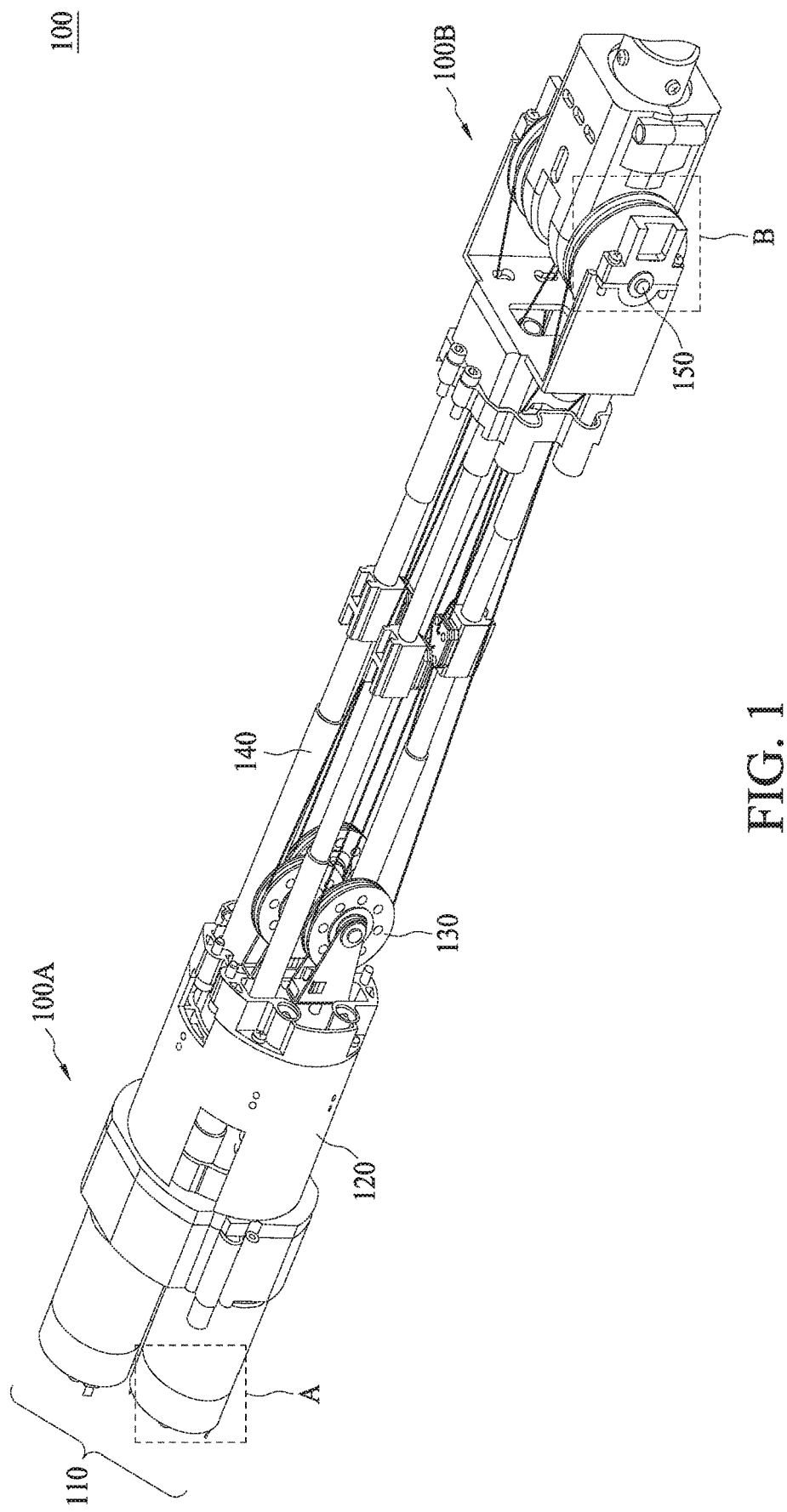
FIG. 1 illustrates a perspective view of a rotatable mechanism in accordance with some embodiments of the present disclosure.

Structures, manufacturing and use of the embodiments of the present disclosure are discussed in detail below. It should be appreciated, however, that the embodiments set forth many applicable concepts that can be embodied in a wide variety of specific contexts. It is to be understood that the following disclosure provides many different embodiments or examples of implementing different features of various embodiments. Specific examples of components and arrangements are described below for purposes of discussion. These are, of course, merely examples and are not intended to be limiting.

Embodiments, or examples, illustrated in the drawings are disclosed below using specific language. It will nevertheless be understood that the embodiments or examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates a perspective view of a rotatable mechanism 100 in accordance with some embodiments of the present disclosure. In some embodiments, the rotatable mechanism 100 is a robotic arm or a portion of a robotic arm. The rotatable mechanism 100 includes has a first end portion 100A and a second end portion 100B opposite to the first end portion 100A. The rotatable mechanism 100 further includes motors 110, a gear reducer 120, a drive plate 130, a screw rod 140 and a joint 150.

The gear reducer 120 is connected to the first end portion 100A of the rotatable mechanism 100 and mounted to the motors 110 to shift the rotational speed of the motors 110. These motors 110 and the gear reducer 120 provide multiple different drivers for the rotatable mechanism 100. The drive plate 130 is rotatably mounted to the first end portion 100A of the rotatable mechanism 100. The screw rod 140 is connected to the first end portion 100A of the rotatable mechanism 100 with the second end portion 100B of the rotatable mechanism 100 to drive the joint 150 to rotate or move using the power generated by the motors 110.

Figure 2:
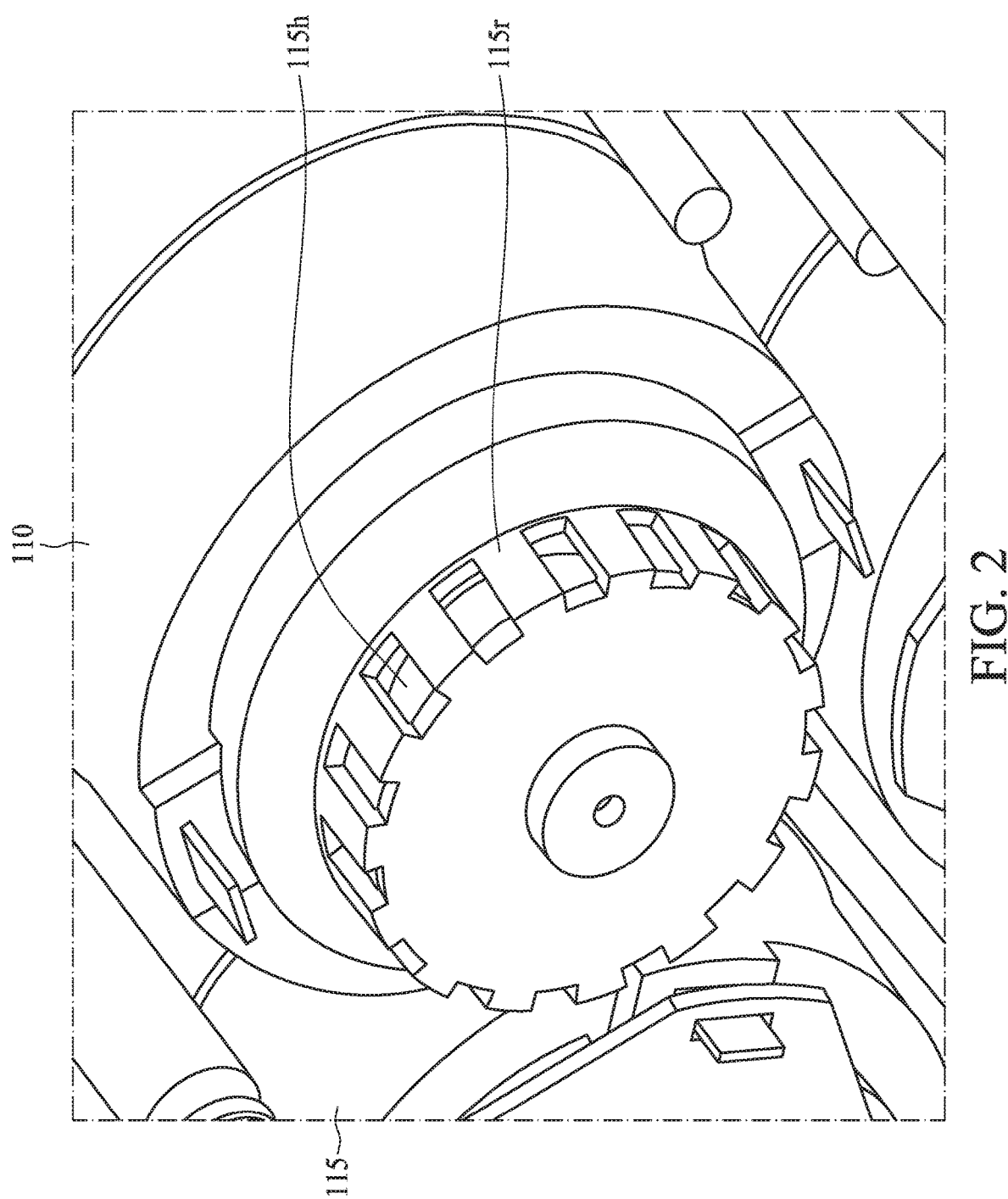
FIG. 2 illustrates an enlarged view of a portion of the rotatable mechanism in FIG. 1 in accordance with some embodiments of the present disclosure.

FIG. 2 illustrates an enlarged view of a portion of the motors 110 in FIG. 1 circled by square A in accordance with some embodiments of the present disclosure. As shown in FIG. 2, an optical encoder 115 is connected to one of the motors 110. The optical encoder 115 includes paired light detectors and light emitters with mechanical interruptions to measure rotary or linear position. For example, the optical encoder 115 has a ring 115r with a plurality of apertures (or transparent portions) 115h and disposed between the light detectors and the light emitters (not shown). If light emitted by a light emitter is detected by a light detector through the aperture 115h or the transparent portion of the ring 115r, a signal with a first voltage level is generated by, for example, the light detector. If a light emitted by a light emitter is blocked by the ring 115r, a signal with a second voltage level is generated by, for example, the light detector. In some embodiments, the first voltage level is different from the second voltage level. For example, the first voltage level is a logic value "1" while the second voltage level is a logic value "0." Since the motor 110 is rotated periodically, periodic interruptions between the light emitter and the light detector occur as the motor 110 rotates, which would generate a stream of pulses as the waveform shown at the lower part of FIG. 4A or 4B.

Figure 3A:
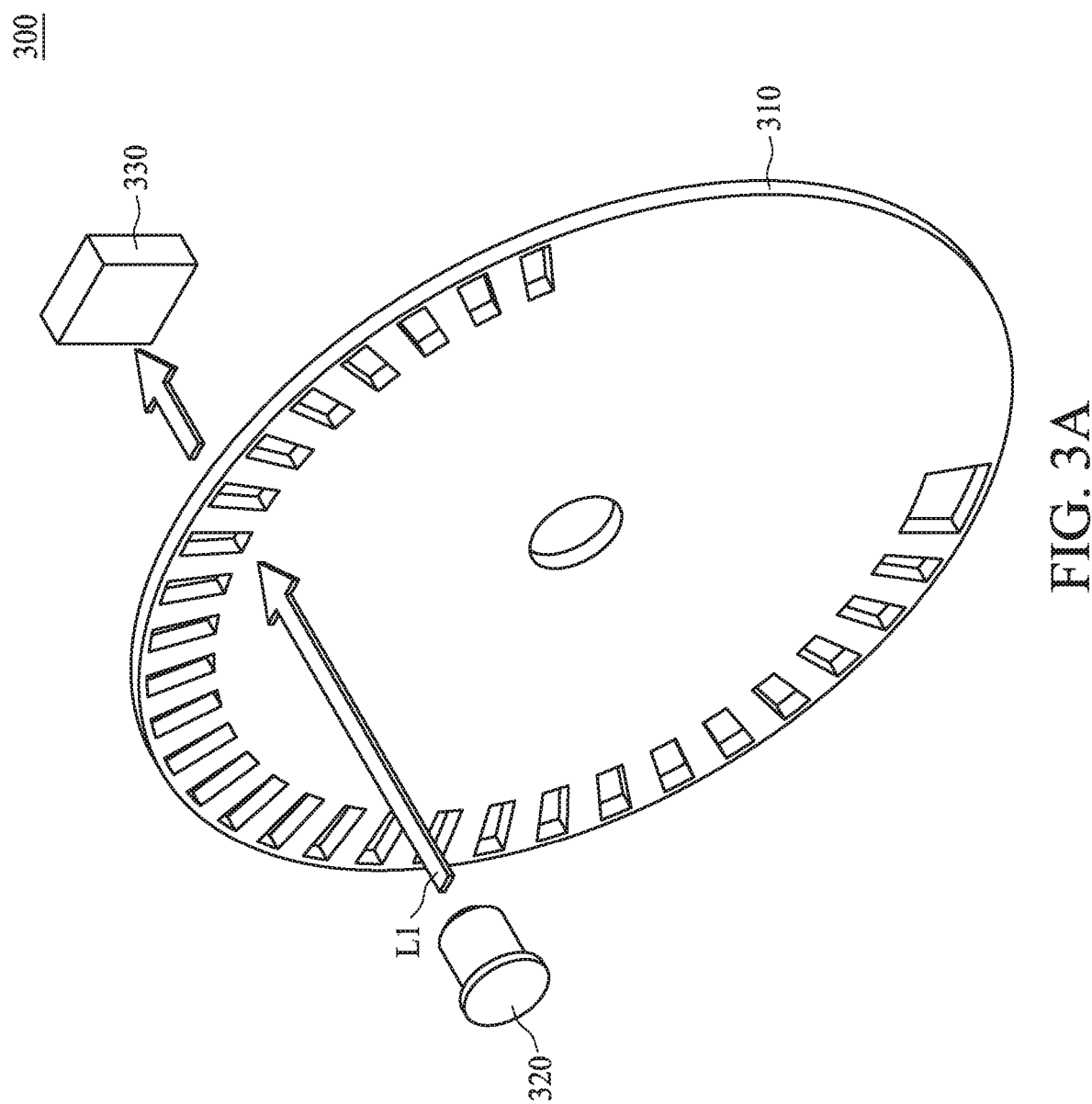
FIG. 3A illustrates a perspective view of an optical encoder in accordance with some embodiments of the present disclosure.

FIG. 3A illustrates a perspective view of an optical encoder 300 in some embodiments of the present disclosure. In some embodiments, the optical encoder 300 can be disposed at the second end portion 100B of the rotatable mechanism 100 in FIG. 1. For example, the optical encoder 300 can be connected to or adjacent to the joint 150 of the rotatable mechanism 100 in FIG. 1. The optical encoder 300 includes a disc (also can be referred to as "encoding disc") 310, a light emitter 320 and a light detector (also can be referred to as "photo detector," "photo sensor" or "optical sensor") 330.

The light emitter 320 has a light emitting region and is configured to generate light. In some embodiments, the light emitter 320 may be a laser diode (LD), a light emitting diode (LED), a vertical-cavity surface-emitting laser (VCSEL)) diode, an edge emitting laser diode or other illuminating component.

The light detector 330 has an optical sensing region facing toward the light emitting region of the light emitter 320. The light detector 330 is configured to receive or detect the light generated from the light emitter 320 and to generate a signal in response to the received or detected light. In some embodiments, the light detector 330 is configured to generate a signal with a first voltage level if the light emitted by the light emitter 320 is detected or received by the light detector 330. In some embodiments, the light detector 330 is configured to generate a signal with a second voltage level if the light emitted by the light emitter 320 is not received or detected by the light detector 330. In some embodiments, the first voltage level is higher than the second voltage level. Alternatively, the first voltage level can be lower than the second voltage level depending on design requirements. In some embodiments, the light detector 330 may include a PIN diode (a diode including a p-type semiconductor region, an intrinsic semiconductor region, and an n-type semiconductor region) or a photo-diode or a photo-transistor.

Figure 3B:
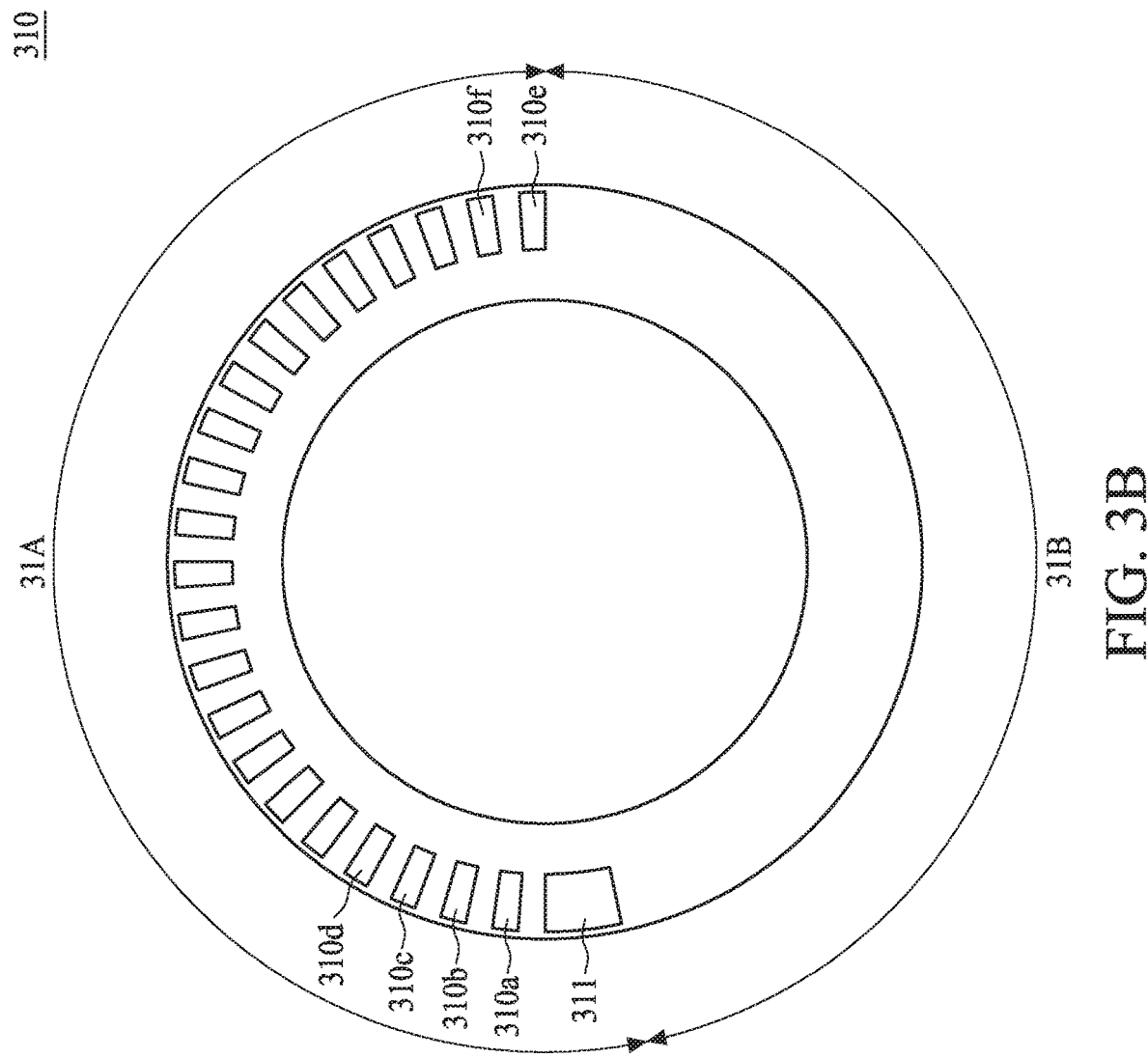
FIG. 3B illustrates a top view of a disc of the optical encoder in FIG. 3A in accordance with some embodiments of the present disclosure.

The disc 310 is disposed between the light emitter 320 and the light detector 330. In some embodiments, the disc 310 is formed of opaque materials. Refer to FIG. 3B, which illustrates a top view of the disc 310 of the optical encoder 300 in some embodiments of the present disclosure, the disc 310 has a first set of apertures (or slots) 310a, 310b, 310c, 310d, 310e and 310f and a second aperture (or slot) 311. In some embodiments, the first set of apertures and the second aperture can be replaced by transparent materials which allow light to pass through them.

The first set of apertures 310a, 310b, 310c, 310d, 310e and 310f penetrate the disc 310 from a surface of the disc 310 to an opposite surface of the disc 310. The first set of apertures 310a, 310b, 310c, 310d, 310e and 310f are disposed adjacent to the periphery of the disc 310. The first set of apertures 310a, 310b, 310c, 310d, 310e and 310f are separated from each other. For example, the aperture 310a is adjacent to the aperture 310b and separated from the aperture 310b. In some embodiments, the widths of the first set of apertures 310a, 310b, 310c, 310d, 310e and 310f are substantially the same. In some embodiments, the distances between any of two adjacent apertures of the first set of apertures 310a, 310b, 310c, 310d, 310e and 310f are substantially the same. For example, a distance between the aperture 310a and the aperture 310b is substantially the same as a distance between the aperture 310b and the aperture 310c. As shown in FIG. 3B, the aperture 310a is located at one end of the first set of apertures 310a, 310b, 310c, 310d, 310e and 310f and the aperture 310e is located at the other end of the first set of apertures 310a, 310b, 310c, 310d, 310e and 310f. For example, the aperture 310a is adjacent to only one aperture (i.e., the aperture 310b) of the first set of apertures 310a, 310b, 310c, 310d, 310e and 310f, and the aperture 310e is adjacent to only one aperture (i.e., the aperture 310f) of the first set of apertures 310a, 310b, 310c, 310d, 310e and 310f.

The second aperture 311 penetrates the disc 310 from the surface of the disc 310 to the opposite surface of the disc 310. The second aperture 311 is located between the aperture 310a and the aperture 310e. As shown in FIG. 3B, the second aperture 311 is closer to the aperture 310a than the aperture 310e. For example, a distance between the second aperture 311 and the aperture 310a is less than a distance between the second aperture 311 and the aperture 310e. In some embodiments, the distance between the second aperture 311 and the aperture 310a is substantially the same as the distance between any two adjacent apertures of the first set of apertures 310a, 310b, 310c, 310d, 310e and 310f. In some embodiments, a width of the second aperture 311 is greater than a width of each of the first set of apertures 310a, 310b, 310c, 310d, 310e and 310f.

In some embodiments, the disc 310 includes a first region 31A on which the first set of apertures 310a, 310b, 310c, 310d, 310e and 310f and the second aperture 311 are located and a second region 31B having no apertures. For example, the second region 31B includes the region between the aperture 310e and the second aperture 311. A length (or arc length) of the second region 31B is greater than a distance between any two adjacent apertures in the first region 31A.

As shown in FIG. 3A, if light L1 emitted by the light emitter 320 is detected by the light detector 330 through any of the first set of apertures 310a, 310b, 310c, 310d, 310e and 310f and the second aperture 311 of the disc 310, a signal with a first voltage level is generated by, for example, the light detector 330. If the light L1 emitted by the light emitter 320 is blocked by the disc 310 (e.g., an opaque portion of the disc 310 between two adjacent apertures or the second portion 31B of the disc 310), a signal with a second voltage level is generated by, for example, the light detector 330. In some embodiments, the first voltage level is higher than the second voltage level. For example, the first voltage level is a logic value "1" while the second voltage level is a logic value "0." Alternatively, the first voltage level may be a logic value "0" while the second voltage level may be a logic value "1" depending on different design requirements. Since the disc 310 is rotated, periodic interruptions between the light emitter 320 and the light detector 330 occur as the disc 310 rotates, which would generate a stream of pulses as the waveform shown at the upper part of FIG. 4A or 4B.

Figure 4A:
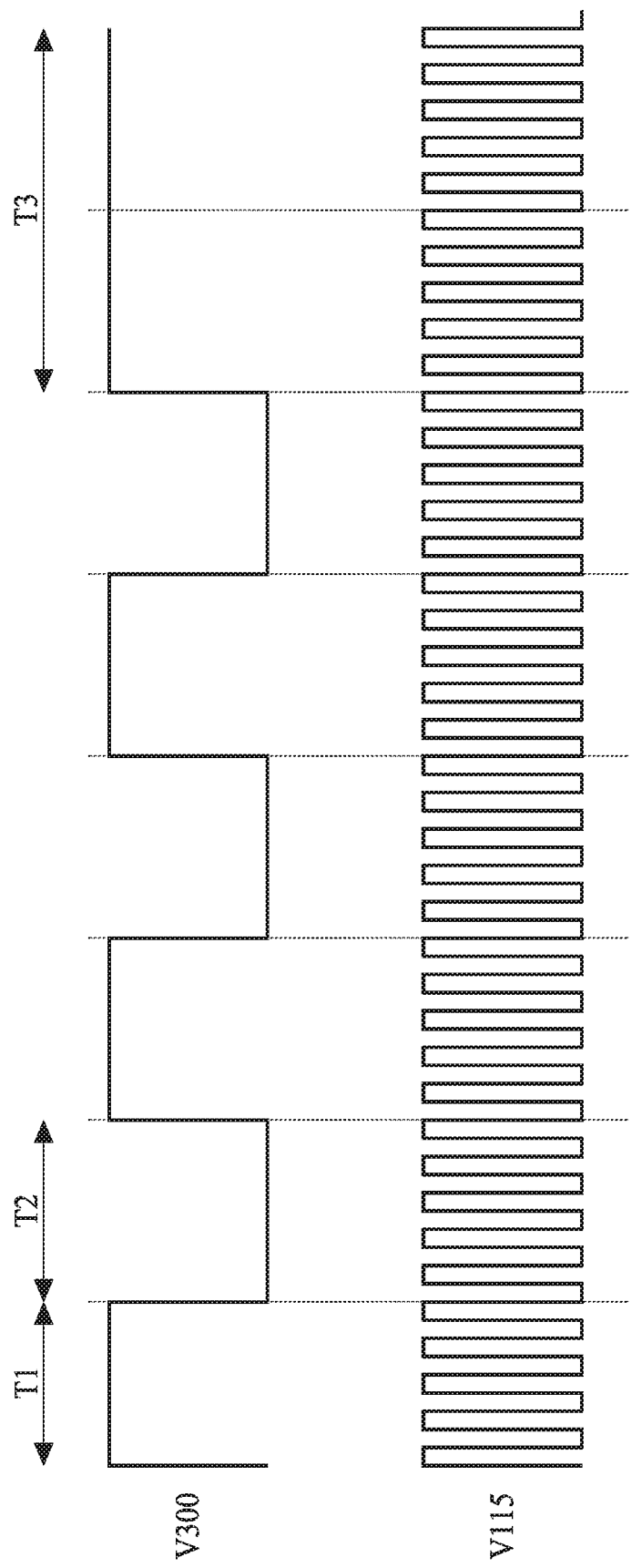
FIG. 4A illustrates waveforms outputted by light detectors in accordance with some embodiments of the present disclosure.

FIG. 4A illustrates a timing diagram of waveforms in accordance with some embodiments of the represent disclosure. In some embodiments, the waveform V300 shown at the upper part of FIG. 4A is generated by the light detector 330 of the optical encoder 300 in FIG. 3A while the waveform V115 shown at the lower part of FIG. 4A is generated by the light detector of the optical encoder 115 in FIG. 2. As shown in FIG. 4A, the waveform V300 has the first voltage level (logic value "1") and the second voltage level (logic value "0"). If light L1 emitted by the light emitter 320 in FIG. 3A is detected by the light detector 330 through any of the first set of apertures 310a, 310b, 310c, 310d, 310e and 310f and the second aperture 311 of the disc 310, a signal with the first voltage level is generated by, for example, the light detector 330. If the light L1 emitted by the light emitter 320 is blocked by the disc 310, a signal with the second voltage level is generated by, for example, the light detector 330. The period T1 of the first voltage level of a pulse is the period during which the aperture is between the light emitter 320 and the light detector 330. The period T2 of the second voltage level of a pulse is the period during which the opaque portion of the disc 310 is between the light emitter 320 and the light detector 330. In some embodiments, the period T1 is identical to the period T2. In some embodiments, the period T1 or T2 represent a rotation angle of the joint 150 shown in FIG. 1. Therefore, the rotation angle of the joint 150 can be derived or obtained through the waveform V300 generated by the light detector 330 of the optical encoder 300.

In some embodiments, as shown in FIG. 1, because the gear reducer 120 is connected to the motors 110 to shift the rotational speed of the motors 110, the angular velocity of disc of the optical encoder 300 (connected to the joint 150) is less than the angular velocity of ring of the optical encoder 115 (connected to the motor 110). Therefore, a frequency of pulses generated by the light detector of the encoder 115 is higher than a frequency of pulses generated by the light detector 330 of the encoder 300. In accordance with some embodiments of the present disclosure, as shown in FIG. 4A, the light detector 330 of the encoder 300 generates one pulse while the light detector of the encoder 115 generates five pulses. For example, a ratio of the frequency of the pulses generated by the light detector of the encoder 115 to the frequency of pulses generated by the light detector 330 of the encoder 300 is about 5:1. In some embodiments, a ratio of the frequency of the pulses generated by the light detector of the encoder 115 to the frequency of pulses generated by the light detector 330 of the encoder 300 can be adjusted depending on different design requirements.

Since the apertures of the ring of the optical encoder 115 have a substantially common width and the first set of apertures 310a, 310b, 310c, 310d, 310e and 310f of the disc 310 of the optical encoder 300 have a substantially common width, the ratio of the frequency of the pulses generated by the light detector of the encoder 115 to the frequency of pulses generated by the light detector 330 of the encoder 300 maintains at 5:1 when the disc 310 rotates within a range between one end of the first set of apertures 310a, 310b, 310c, 310d, 310e and 310f and the other end of the first set of apertures 310a, 310b, 310c, 310d, 310e and 310f (i.e., between the aperture 310a to the aperture 310e). In this situation, the joint 150 operates in a working range, and the rotation of the joint 150 has not reached a limited angle yet. In other words, when the joint 150 operates in the working range, the voltage level of the signal generated by the light detector 330 of the encoder 300 would be shifted (from logic value "1" to logic value "0" or from logic value "0" to logic value "1") once the light detector of the encoder 115 generates five pulses (or other numbers of pulses depending on different embodiments).

When the disc 310 keeps rotating clockwise until the second aperture 311 is located between the light emitter 320 and the light detector 330, the signal generated by the light detector 330 of the encoder 300 would be maintained at the first voltage level (logic value "1") even if the light detector of the encoder 115 generates five or more pulses (as shown in the period T3 of FIG. 4A). In this situation, the rotation of the joint 150 has reached the limited angle in a clockwise direction and should be terminated.

Figure 4B:
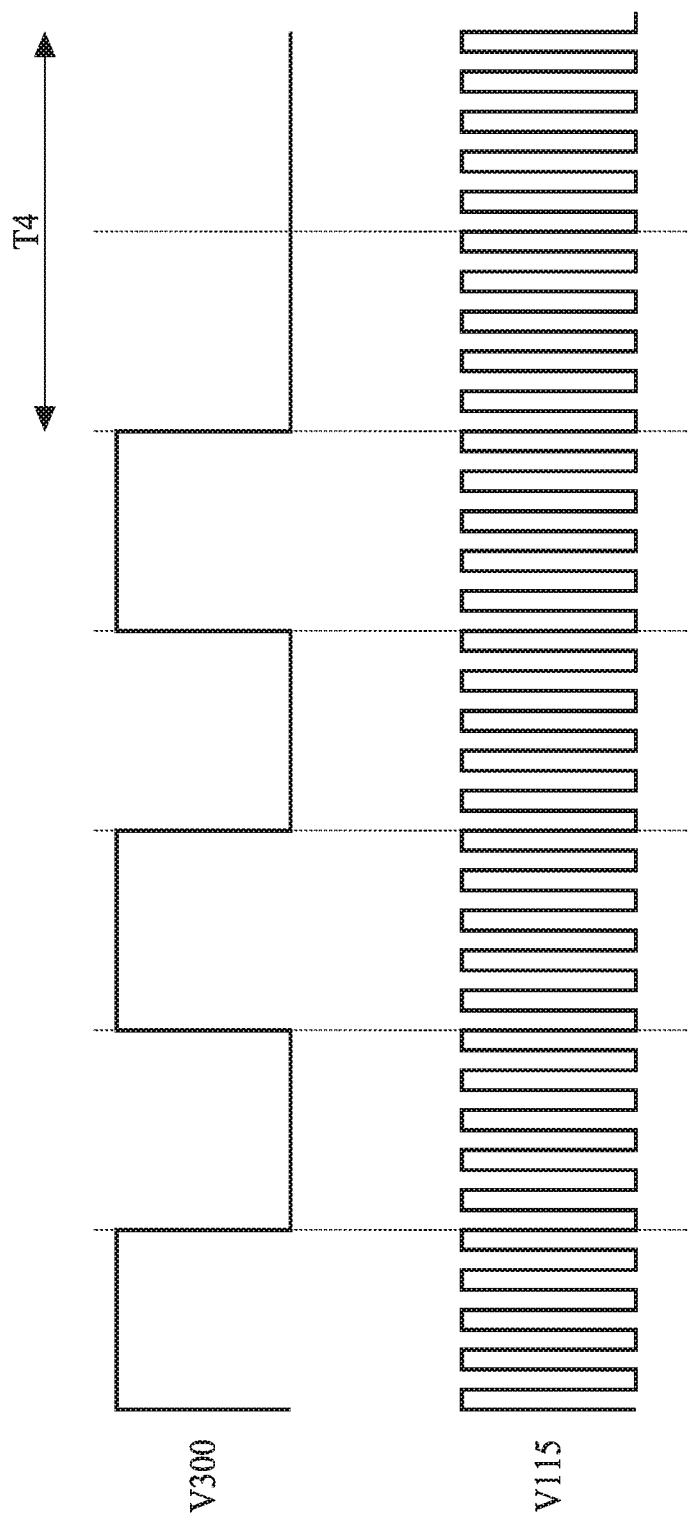
FIG. 4B illustrates waveforms outputted by light detectors in accordance with some embodiments of the present disclosure.

Similarly, when the disc 310 keeps rotating counterclockwise until the second region 31B of the disc 310 is located between the light emitter 320 and the light detector 330, the signal generated by the light detector 330 of the encoder 300 would maintain at the second voltage level (logic value "0") even the light detector of the encoder 115 generates five or more pulses (as shown in the period T4 of FIG. 4B). In this situation, the rotation of the joint 150 has reached the limited angle in a counterclockwise direction and should be terminated.

In some existing approaches, two optical encoders are required at the joint part of the rotation mechanism, wherein one optical encoder is used to detect or measure the position or the rotating angle of the rotation mechanism and the other is used to determine whether the position or the rotation angle of the rotation mechanism has reached a limited portion or angle. However, the use of two optical encoders would increase the manufacturing cost. In accordance with some embodiments of the present disclosure, as shown in FIG. 1 to FIG. 4B, both of a rotation angle or position and the limited angle or position can be determined by using a single optical encoder 310 that includes a disc 310 having apertures with different widths (i.e., the width of each of the first set of apertures and the width of the second aperture). Therefore, the total manufacturing cost of the rotatable mechanism 100 can be reduced.

Figure 5:
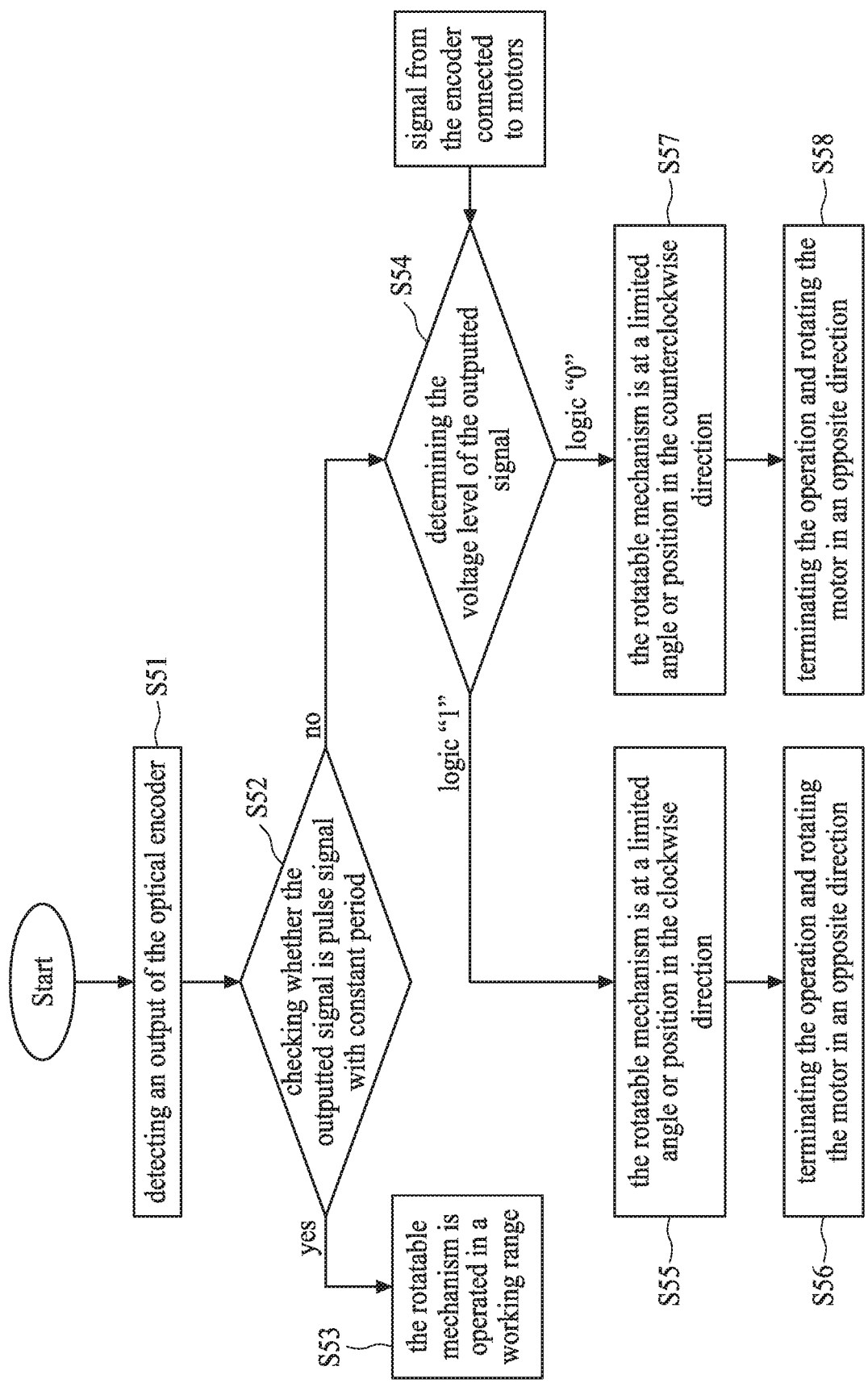
FIG. 5 illustrates a flow chart of a method of operating the rotatable mechanism in FIG. 1 in accordance with some embodiments of the present disclosure.

FIG. 5 illustrates a flow chart showing a method of operating the rotatable mechanism 100 in FIG. 1 in accordance with some embodiments of the present disclosure. In some embodiments, the method shown in FIG. 5 can be used to operate other rotatable mechanisms depending on different design requirements.

Referring to S51, when the rotatable mechanism 100 start operating, the disc 310 of the optical encoder 300 connected to the joint 150 start rotating as the motor 110 rotates, and then a signal at an output of the light detector 330 of the optical encoder 300 is detected. In some embodiments, the signal at the output of the light detector 330 of the optical encoder 300 is a digital signal as shown in FIGS. 4A and 4B. Alternatively, the signal at the output of the light detector 330 of the optical encoder 300 can be an analog signal and then converted into a digital signal by an analog-to-digital converter.

Referring to S52, the signal at the output of the light detector 330 of the optical encoder 300 is checked to determine whether the outputted signal is a pulse signal having constant period.

Referring to S53, if the outputted signal is a pulse signal having constant period (e.g., the pulse with period T1 or T2 as shown in FIG. 4A), the rotatable mechanism 100 is operated in a working range, and the rotation angle of the joint 150 can be obtained or derived through the waveform generated by the light detector 330 of the optical encoder 300.

Referring to S54, if the signal generated by the light detector 330 of the encoder 300 is maintained at a fixed voltage level (as shown in the period T3 of FIG. 4A or the period T4 of FIG. 4B), it will be determined that the rotation of the joint 150 has reached the limited angle (based on signal of the encoder 115 connected to the motors 110) even if the light detector of the encoder 115 connected to the motors 110 generates a predetermined number of pulses (e.g., five or more pulses).

Referring to S55, if the fixed voltage level is logic value "1" (as shown in the period T3 of FIG. 4A), it will be determined that the joint 150 has reached the limited angle in a clockwise direction. Referring to S56, the rotation of the joint 150 is terminated and then the motors 110 start rotating in an opposite direction to reset the position of the joint 150.

Referring to S57, if the fixed voltage level is logic value "0" (as shown in the period T4 of FIG. 4B), it will be determined that the joint 150 has reached the limited angle in a counterclockwise direction. Referring to S58, the rotation of the joint 150 is terminated and then the motors 110 start rotating in an opposite direction to reset the position of the joint 150.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It can be clearly understood by those skilled in the art that various changes may be made, and equivalent components may be substituted within the embodiments without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and such. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. A coding disc having a first surface and a second surface opposite to the first surface, comprising:
   a first region in which a plurality of apertures/slots are located; and
   a second region having no apertures/slots, wherein the plurality of apertures/slots include:
      a plurality of first apertures/slots penetrating the coding disc from the first surface of the coding disc to the second surface of the coding disc, wherein each of the plurality of first apertures/slots has a first width, and the plurality of first apertures/slots are equally spaced; and a second aperture/slot penetrating the coding disc from the first surface of the coding disc to the second surface of the coding disc, the second aperture/slot having a second width,
   wherein the second width of the second aperture/slot is different from the first width of the plurality of first apertures/slots; and
   wherein an arc length of the second region is greater than an arc length between any two adjacent apertures/slots of the plurality of first apertures/slots in the first region.

2. The coding disc of claim 1, wherein the second width of the second aperture/slot is greater than the first width of the plurality of first apertures/slots.

3. The coding disc of claim 1, wherein an arc length between the second aperture/slot and one of the plurality of first apertures/slots at a first side of the second aperture/slot is greater than an arc length between the second aperture/slot and another one of the plurality of first apertures/slots at a second side of the second aperture/slot.

4. The coding disc of claim 1, wherein the plurality of apertures/slots are disposed adjacent to a periphery of the coding disc.

5. An encoder, comprising:
   a light emitter having a light emitting region;
   an optical sensor having an optical sensing region facing the light emitting region; and
   an opaque plate disposed between the light emitting region and the optical sensing region, the opaque plate comprising:
      a first region in which a plurality of apertures/slots are located; and
      a second region having no apertures/slots, wherein the plurality of apertures/slots include:
         a plurality of first apertures/slots penetrating the opaque plate, wherein each of the plurality of first apertures/slots has a first width, and the plurality of first apertures/slots are equally spaced; and
         a second aperture/slot penetrating the opaque plate, the second aperture/slot having a second width, wherein the second width of the second aperture/slot is different from the first width of the plurality of first apertures/slots; and
         wherein an arc length of the second region is greater than an arc length between any two adjacent apertures/slots of the plurality of first apertures/slots in the first region.

6. The encoder of claim 5, wherein the optical sensor is configured to:
   generate a first signal while light passing through the plurality of first apertures/slots arrives at the optical sensing region; and
   generate a second signal while no light arrives at the optical sensing region.

7. The encoder of claim 6, wherein the first signal has a first voltage level and the second signal has a second voltage level, and wherein the first voltage level is greater than the second voltage level.

8. The encoder of claim 7, wherein a time period of the first signal represents a first rotation degree/angle of the opaque plate; and a time period of the second signal represents a second rotation degree/angle of the opaque plate.

9. The encoder of claim 8, wherein the first rotation degree/angle is substantially the same as the second rotation degree/angle.

10. The encoder of claim 7, wherein the optical sensor generates a third signal while light passing through the second aperture/slot arrives at the optical sensing region, and wherein the third signal has the first voltage level; and wherein a time period of the third signal is greater than a time period of the first signal.

11. The encoder of claim 5, wherein the second width of the second aperture/slot is greater than the first width of the plurality of first apertures/slots.

12. The encoder of claim 5, wherein an arc length between the second aperture/slot and one of the plurality of first apertures/slots at a first side of the second aperture/slot is greater than an arc length between the second aperture/slot and another one of the plurality of first apertures/slots at a second side of the second aperture/slot.

13. A method of determining a position of a coding disc, comprising:
   providing a light emitter having a light emitting region and an optical sensor having an optical sensing region facing the light emitting region, wherein the coding disc is disposed between the light emitting region and the optical sensing region, and wherein the coding disc comprises:
      a first region in which a plurality of apertures/slots are located; and
      a second region having no apertures/slots, wherein an arc length of the second region is greater than an arc length between any two adjacent apertures/slots in the first region, wherein the plurality of apertures/slots include:
         a plurality of first apertures/slots penetrating the coding disc, wherein each of the plurality of first apertures/slots has a first width, and the plurality of first apertures/slots are equally spaced; and
         a second aperture/slot penetrating the coding disc, the second aperture/slot having a second width different from the first width of the plurality of first apertures/slots;
   determining a reference time period from a signal of the optical sensor generated while a light from the light emitting region passing through the plurality of first apertures/slots arrives at the optical sensing region, wherein the signal of the optical sensor varies periodically between a first voltage level and a second voltage level during the reference time period;
   comparing a time period of the signal of the optical sensor with the reference time period; and
   determining the position of the coding disc depending on the comparison between the time period and the reference time period;
   wherein the position of the coding disc is determined to be at an intermediate position while the time period is substantially the same as the reference time period; and
   wherein the position of the coding disc is determined to be at a terminal/end position while the time period is greater than the reference time period.

14. The method of claim 13, wherein the coding disc is determined to be at a first terminal/end position while the time period is greater than the reference time period and the signal has the first voltage level; wherein the coding disc is determined to be at a second terminal/end position while the time period is greater than the reference time period and the signal has the second voltage level; and wherein the first voltage level is different from the second voltage level.

* * * * *